United States Patent [19]

Biles

[11] Patent Number: 5,537,232
[45] Date of Patent: Jul. 16, 1996

[54] REFLECTION HOLOGRAM MULTIPLE-COLOR FILTER ARRAY FORMED BY SEQUENTIAL EXPOSURE TO A LIGHT SOURCE

[75] Inventor: Jonathan R. Biles, Portland, Oreg.

[73] Assignee: In Focus Systems, Inc., Tualatin, Oreg.

[21] Appl. No.: 131,719

[22] Filed: Oct. 5, 1993

[51] Int. Cl.$^6$ .............................. G02B 5/32; G03H 1/26; G02F 1/1335
[52] U.S. Cl. .............................. 359/15; 359/68; 359/900; 359/22; 359/25; 430/2
[58] Field of Search ................................. 359/68, 65, 64, 359/73, 15, 22, 3, 566, 25, 900, 634; 430/1, 2

[56] References Cited

U.S. PATENT DOCUMENTS

| | | | |
|---|---|---|---|
| 4,017,158 | 4/1977 | Booth | 350/162 SF |
| 4,019,808 | 4/1977 | Scheffer | 359/73 |
| 4,025,161 | 5/1977 | LaRoche | 359/73 |
| 4,470,667 | 9/1984 | Okubo et al. | 359/68 |
| 4,582,389 | 4/1986 | Wood et al. | 350/3.69 |
| 4,655,540 | 4/1987 | Wood et al. | 350/3.7 |
| 4,657,348 | 4/1987 | Ziegler | 359/73 |
| 4,717,221 | 1/1988 | McGrew | 350/3.7 |
| 4,717,784 | 1/1988 | Stern et al. | 585/738 |
| 4,807,978 | 2/1989 | Grinberg et al. | 350/3.73 |
| 5,011,244 | 4/1991 | Smith et al. | 350/3.75 |
| 5,066,108 | 11/1991 | McDonald | 359/73 |
| 5,164,858 | 11/1992 | Aguilera, Jr. et al. | 359/587 |
| 5,198,911 | 3/1993 | Ning | 359/15 |
| 5,267,060 | 11/1993 | Colton | 359/15 |

FOREIGN PATENT DOCUMENTS

| | | | |
|---|---|---|---|
| 23352A1 | 4/1991 | European Pat. Off. | G02B 5/20 |

OTHER PUBLICATIONS

A. Conner, J. Biles, "Hybrid Color Display Using Optical Interference Filter Array," *SID 93 Digest*, May 18–20, 1993, pp. 577–5 80.

H. Kamamori, et al., "Multicolor STN–LCD With Self-–Aligned Tricolor Filters in a Black Matrix," *1988 Int'l Display Research Conf.* (IEEE), pp. 90–93.

Satoshi Okazaki, "Color Filter for Liquid–Crystal Display," *The Transactions of the IEICE*, vol. E71, No. 11, Nov. 1988, pp. 1077–1079.

*Primary Examiner*—Anita Pellman Gross
*Assistant Examiner*—Kenneth Parker
*Attorney, Agent, or Firm*—Stoel Rives

[57] ABSTRACT

A multiple-color filter array (94) useful as part of a flat panel display system of either a projection (50) or direct view (70) type is constructed using reflection holography techniques. The filter array includes multiple-color filter elements (110, 114, 116) that reflect wavelengths of light corresponding to colors outside of a color band of interest. Redundant sets of first, second, and third wavelengths selective reflective color filter elements are arranged in stripes to transmit light of the three primary colors red, green, and blue. The three-color filter array is constructed in a single layer (122) of holographic recording material during one sequence of three separate exposures, one for each color filter element. A preferred flat panel display system (200) includes a liquid crystal variable optical retarder of the supertwisted nematic (STN) type. The direct view system includes a spurious light reflection absorber (204), one of whose optical components is selected in association with the residual retardation compensator plate (214) of the preferred liquid crystal variable optical retarder.

8 Claims, 9 Drawing Sheets

REFLECTION HOLOGRAM MULTIPLE-COLOR FILTER ARRAY FORMED BY SEQUENTIAL EXPOSURE TO A LIGHT SOURCE

TECHNICAL FIELD

The present invention relates to color filter arrays and, in particular, to a multiple-color filter array constructed using reflection holography techniques.

BACKGROUND OF THE INVENTION

There is a need for three-color flat panel displays such as liquid crystal displays ("LCDs"). The most common way to fabricate an LCD having red, green, and blue colors is to use color filters positioned in optical series with the LCD. The display elements or "pixels" of the LCD itself are designed to be achromatic in that they display only shades of neutral gray. Color is obtained by spatially aligning to the pixels a filter comprised of repetitive groups of adjacent red, green, and blue stripes, each having the width of one pixel. The display electronics sends red, green, and blue image information to corresponding pixels aligned with the respective red, green, and blue stripes. The result is a red, green, and blue pixel for every pixel of full color information.

The prior art has two basic kinds of color filters for LCDs. These include dyed filters and vacuum deposited interference filters. Dyed filters are made of colored dyes that are impregnated into a particular type of polymer matrix. Dyed filters are difficult to make, requiring separate patterning and dying operations for all three colors. Moreover, dyes are limited by gradual color transition edges and low transmission properties. The gradual color transition edges permit the other colors to leak through and thereby degrade color saturation, and the low color transmissions degrade the brightness of the LCD image.

The transmission spectra of red, green, and blue colored dye filters are superimposed in FIG. 1. With reference to FIG. 1, each of the red transmission spectrum 12, green transmission spectrum 14, and blue transmission spectrum 16 is broad and not highly transmissive. The broadness of the spectra degrades the color saturation as a consequence of light leakage from adjacent spectral colors. The dyes do, however, have the advantage of not appreciably changing colors with angle of view because the absorption properties of the dyes are angle independent. For off-axis angles, the transmission decreases slightly because of an increased path length through the dye.

The vacuum deposited interference filters are constructed with thin film layers evaporated in a vacuum chamber. Although they have high transmission properties and rapid color edge transitions, interference color filters have never become commercially accepted because of the high cost associated with their construction. The reason is that, for each of the three colors, a filter must be patterned with photoresist, placed in an evacuated coating chamber, and have properly aligned film layers. Along with the high cost, vacuum deposited interference filters change their colors with angle because the apparent thickness of the interference layer changes with angle. The three spectra of such a vacuum deposited filter are shown in FIG. 2. FIG. 2 shows similar curves for filters made by vacuum deposited thin films that use optical interference to produce colors. With reference to FIG. 2, red transmission spectrum 18, green transmission spectrum 20, and blue transmission spectrum 22, have much sharper edge transitions than those of FIG. 1, produce more saturated colors, and have higher transmissions. Interference filters are made of discrete layers of high and low index materials, instead of the ideal sinusoidal variations, so there is usually some undesirable "ringing" of the spectra.

A holographic filter is a wavelength selective type of color filter that is sometimes called a "holographic mirror." Holographic mirrors have been produced for avionics head-up displays and eye protection shields from laser light. FIG. 3 shows an exemplary spectrum 24 of a holographic filter. No prior art filter includes segmented holographic mirrors arranged in arrays of color filters.

SUMMARY OF THE INVENTION

An object of the invention is to provide a multiple-color filter array with high transmission and rapid color edge transition characteristics.

Another object of the invention is to provide such a color filter array that can be relatively easily constructed.

A further object of the invention is to provide such a color filter array constructed using reflection holography techniques.

Still another object of the invention is to incorporate such a color filter array in a flat panel display system.

The present invention is a multiple-color filter array constructed using reflection holography techniques. The filter array includes multiple color filter elements that reflect wavelengths of light corresponding to colors outside of a color band of interest. In a preferred embodiment of a three-color filter array for use in a data monitor, redundant sets of first, second, and third wavelength selective reflective color filter elements are arranged in stripes to transmit light of the three primary colors red, green, and blue. The first color filter element is constructed to reflect green and blue light and thereby transmit red light; the second color filter element is constructed to reflect red and blue light and thereby transmit green light; and the third color filter element is constructed to reflect red and green light and thereby transmit blue light.

The three-color filter array is constructed in a single layer of holographic recording material during one sequence of three separate exposures, one for each color filter element. The exposures may be accomplished by using a single wavelength of light at three different angles of incidence, by using three different wavelengths of light at the same angle of incidence, or a combination of different wavelengths and angles of incidence. This procedure permits the holographic recording material, such as dichromated gelatin, to be developed during a single wet process.

The color filter array may be included as part of a flat panel display system of either a projection or direct view type. The color filter and the image display surface of the display system are positioned so that the first, second, and third color filter element stripes are spatially aligned with the display system pixels. A set of three adjacent pixels forms, therefore, a full color information pixel of the display.

A preferred flat panel display system includes a liquid crystal variable optical retarder of the supertwisted nematic (STN) type, but the invention may be used in other display devices such as a thin film transistor (TFT) device. The direct view system includes a spurious light reflection absorber, one of whose optical components is selected in association with the residual retardation compensator of the preferred liquid crystal variable optical retarder.

Additional objects and advantages of the present invention will be apparent from the detailed description of the preferred embodiment thereof, which proceeds with references to the accompanying drawings.

DETAILED DESCRIPTION OF PREFERRED EMBODIMENTS

Figure 4A:
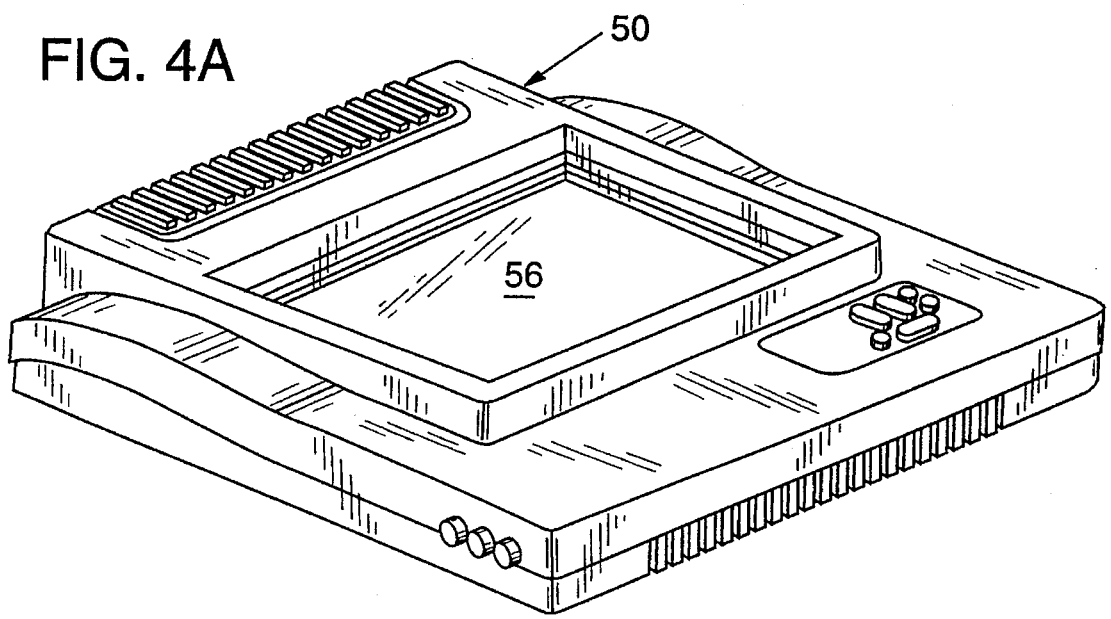
FIGS. 4A and 4B show a projection display panel that when in use is positioned on the platen of an overhead projector.
Figure 4B:
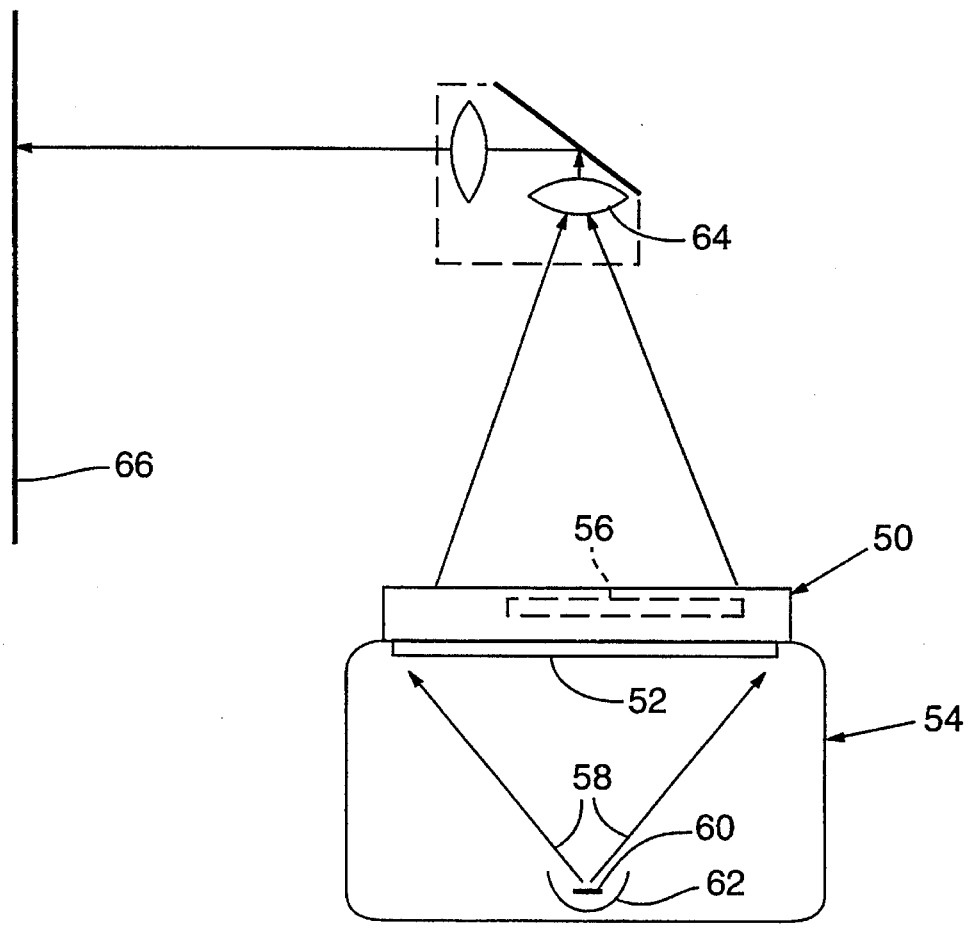
Figure 5:
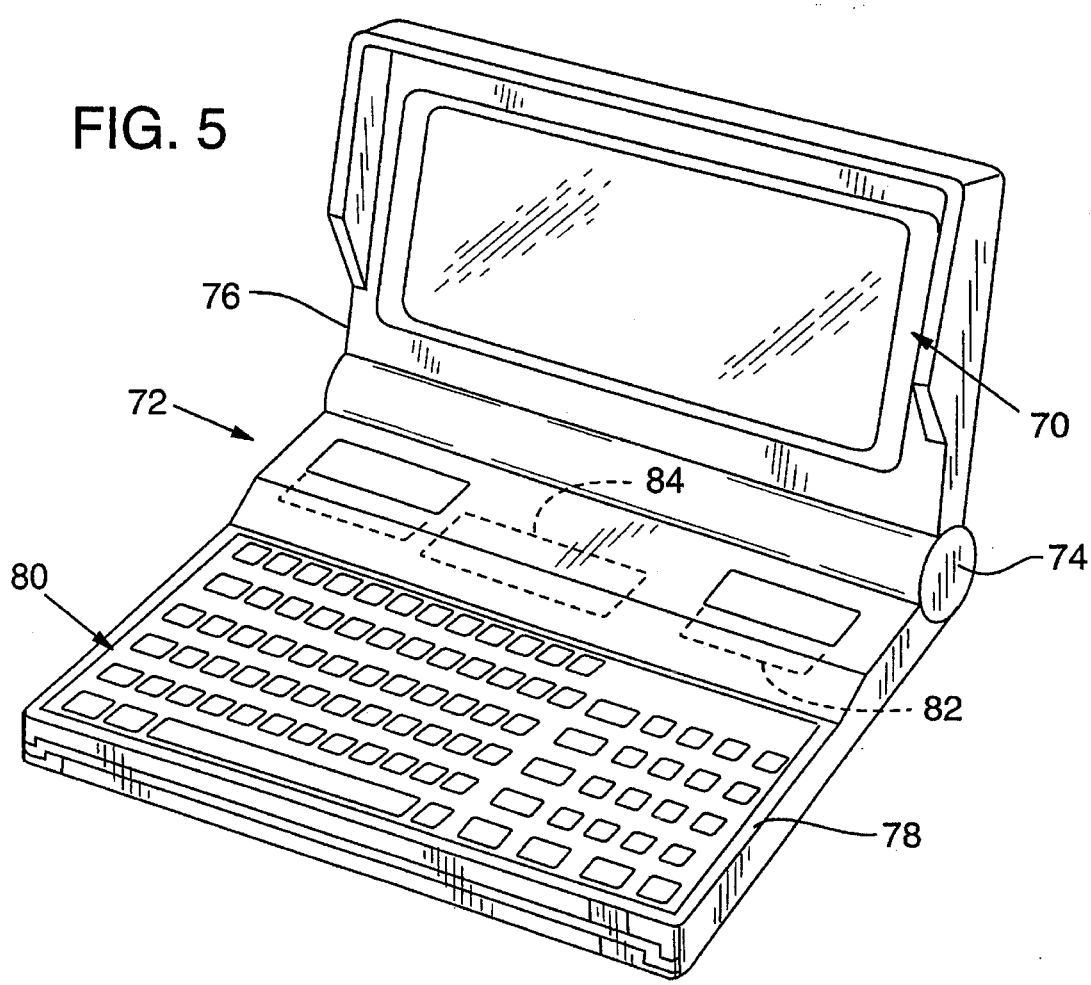
FIG. 5 shows a direct view display panel in the form of a laptop computer.

FIGS. 4A and 4B and FIG. 5 show two types of display systems in which a color filter of the present invention can be incorporated. FIGS. 4A and 4B show a projection display panel 50 that when in use is positioned on an optically transparent surface or platen 52 of an overhead projector 54. Display panel 50 includes display surface 56 on which arbitrary information patterns appear in response to electrical signals provided to display panel 50 by a personal computer or other information source (not shown). These electrical signals modulate the content and color of the information patterns formed on display surface 56 in accordance with input information data. Light rays 58 propagating from a light bulb 60 and reflected by a reflector 62 pass through projector surface 52 and display surface 56 of display panel 50 to a projection lens assembly 64, which expands the information patterns carried by the light rays and directs them to a projection screen 66. An observer looks at projection screen 66 to view the information patterns.

FIG. 5 shows a direct view display panel 70 in the form of a laptop computer 72. Laptop computer 72 is housed in a foldable case 74 comprised of a lid 76 that carries display panel 70 and is hinge-mounted to a base 78 that carries a keyboard 80, a disk drive 82, and other electronics components 84. Display panel 70 is back-lighted by a light source (not shown) mounted in lid 76 and receives electrical signals that modulate the content and color of image patterns formed in accordance with input information data. An observer looks directly at display panel 70 to view the information patterns.

Figure 6:
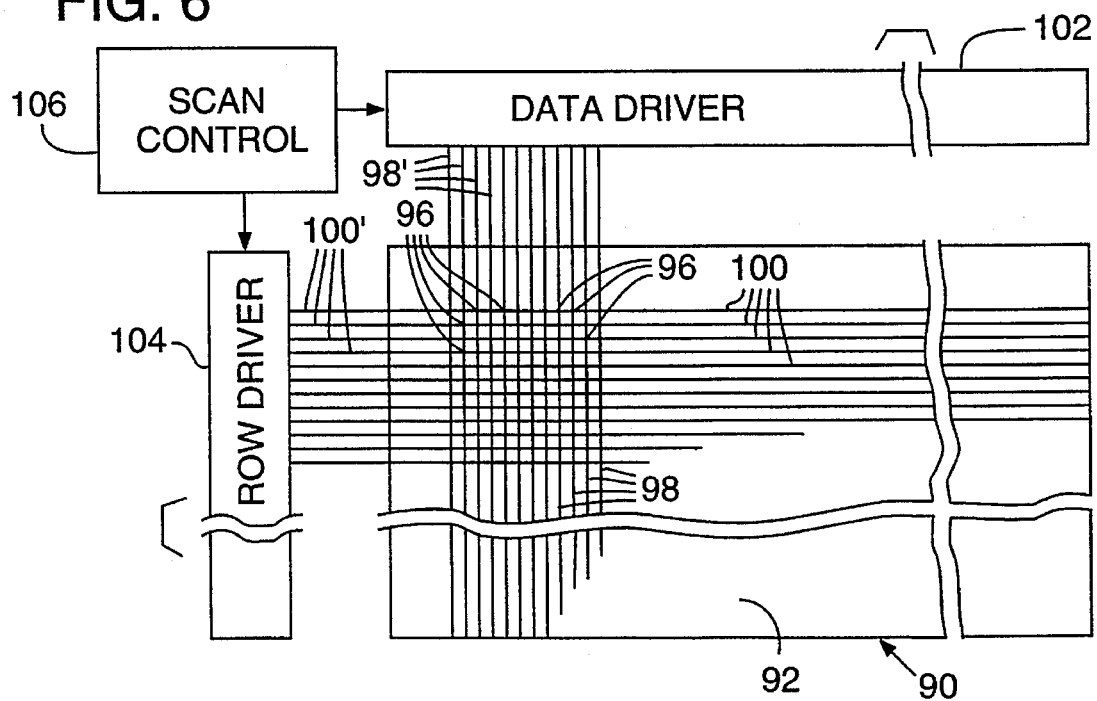
FIG. 6 is a frontal view of a flat panel display together with drive circuitry suitable for use as a projection or direct view display panel.
Figure 12:
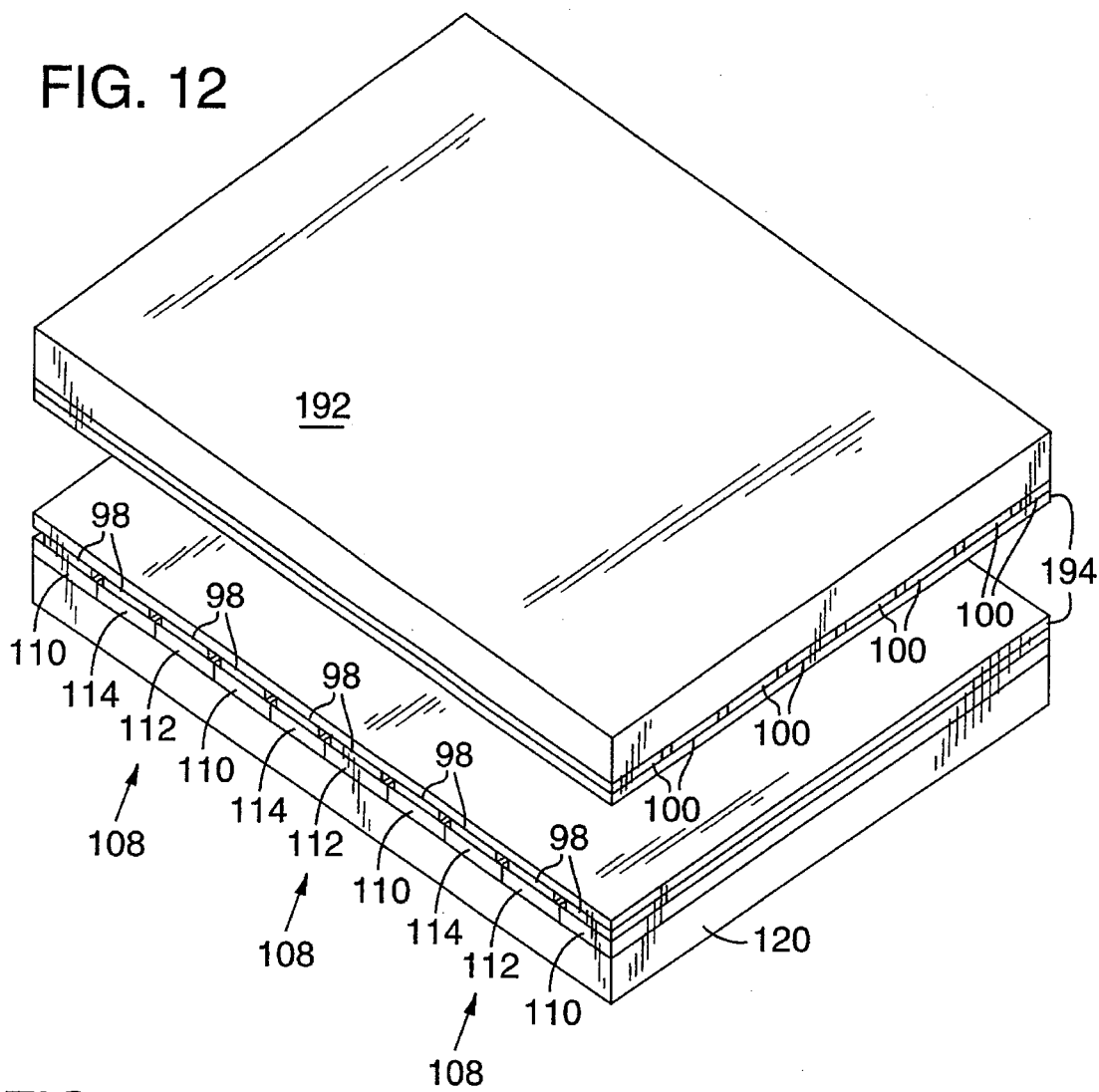
FIG. 12 is a fragmentary isometric view of a flat panel display of the present invention showing the spatial relationships among the column and row electrodes and color filter array.

FIG. 6 is a frontal view of a flat panel display 90 together with drive circuitry suitable for use as a projection display panel 50 or a direct view display panel 70 that displays character or television-type image data. Display 90 includes an image pattern display surface 92 positioned in front of, optically coupled to, and spatially aligned with a color filter array 94 (FIG. 12). Display surface 92 contains a pattern formed by a rectangular array of nominally identical display elements 96 mutually spaced apart by predetermined distances in the vertical and horizontal directions. Each display element 96 in the array represents the overlapping portions of thin, narrow electrodes 98 arranged in vertical columns and thin, narrow electrodes 100 arranged in horizontal rows. Display elements 96 in each of the rows of electrodes 100 represent one line of character data or picture images. Column electrodes 98 receive analog voltage signals developed on parallel output conductors 98' of a data driver 102, and row electrodes 100 receive voltage pulse signals developed on parallel output conductors 100' of a row driver 104. A scan control circuit 106 coordinates the functions of data driver 102 and row driver 104 so that all columns of display elements 96 are addressed row by row in row scan fashion.

A monochrome or black-and-white display system with gray scale luminance qualities can be implemented with the use of display surface 92. A full color display system with controllable color intensity is implemented by positioning behind display surface 92 a color filter array 94 containing groups 108 of color filter elements spatially aligned with display elements 96. Each of the color filter elements represents a different one of three primary colors. A set of three adjacent display elements 96 spatially aligned with a group 108 of color filter elements represents, therefore, one image pixel whose color is determined by the relative intensities of the color filter elements in the group.

For flat panel display 90, groups 108 of color filter elements in three primary colors are formed by repetitive adjacent sets of three vertical color stripes 110, 112, and 114, each color stripe in a set representing a different one of the three primary colors. Color stripes 110, 112, and 114 spatially overlap and are aligned with column electrodes 98. Because the borders of display elements 96 align in the vertical and horizontal directions, there is no need to provide spaces between adjacent display elements 96 in the vertical direction of the color stripes. Skilled persons will appreciate that a limited color display system would be implemented by using a color filter array containing groups of two color filter elements spatially aligned with the display elements.

Figure 7A:
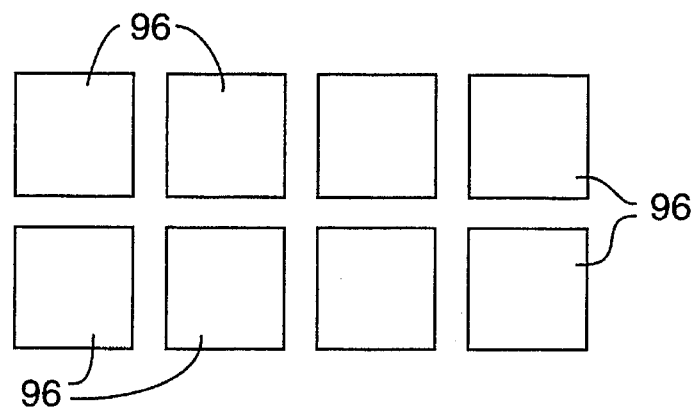
FIGS. 7A and 7B show respective rectangular and staggered display element patterns that the color filter arrays of the present invention overlap.
Figure 7B:
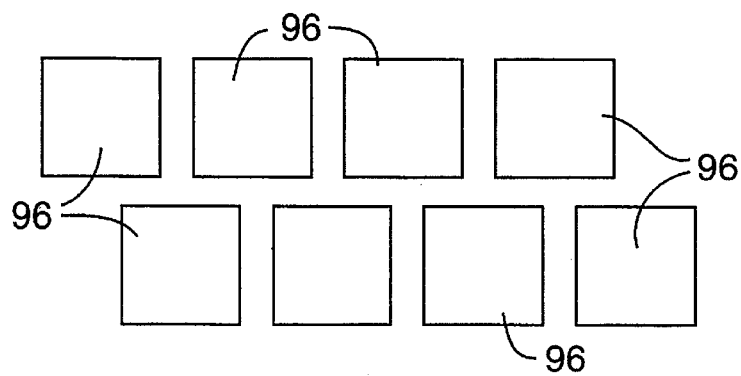

FIGS. 7A and 7B show rectangular and staggered display element patterns that the color filter array elements overlap. The rectangular pattern of FIG. 7A represents that used in STN displays for character data and picture images. Because display elements 96 are arranged in straight lines in two dimensions, color filter array elements in the form of stripes 110, 112, and 114 are possible. The staggered display element pattern of FIG. 7B represents that used in thin film transistor (TFT) displays for character data and picture images. Because display elements 96 are arranged in a straight line in only one direction, color filter array elements in the form of rectangles are spaced apart in the same spatial relation as that of display elements 96. The following descriptions are directed to forming a color filter array 94 of a type suitable for use with the preferred STN display element configuration of FIG. 7A.

Figure 1:
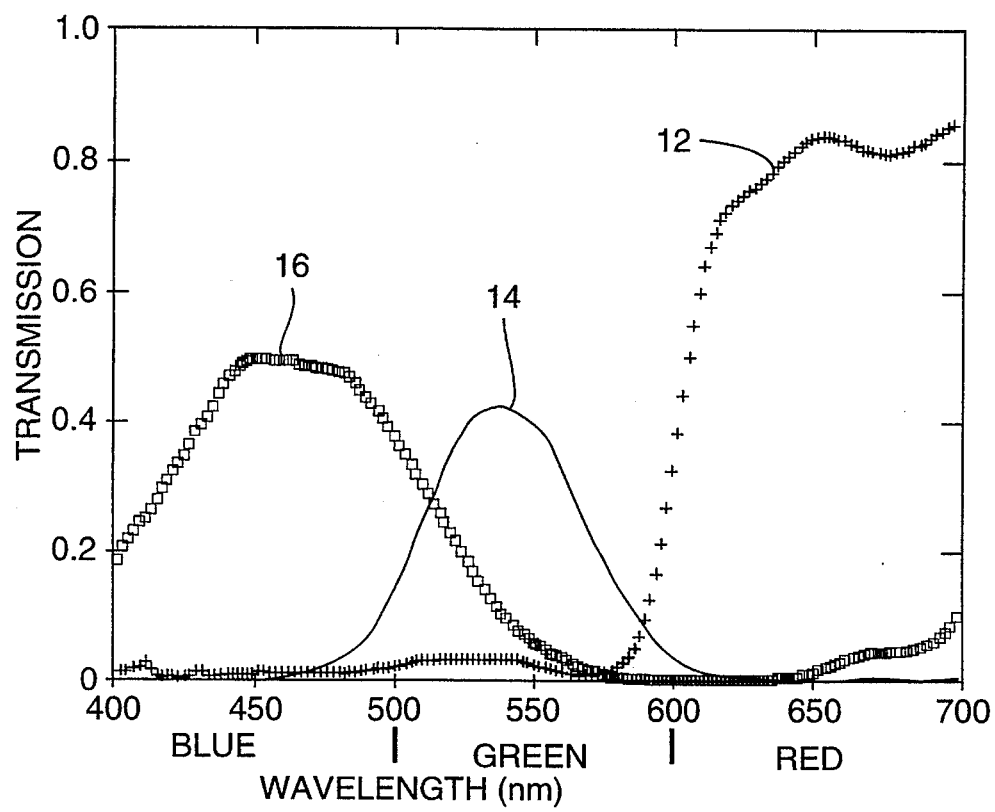
FIG. 1 shows the three spectra of a dyed color filter.
Figure 3:
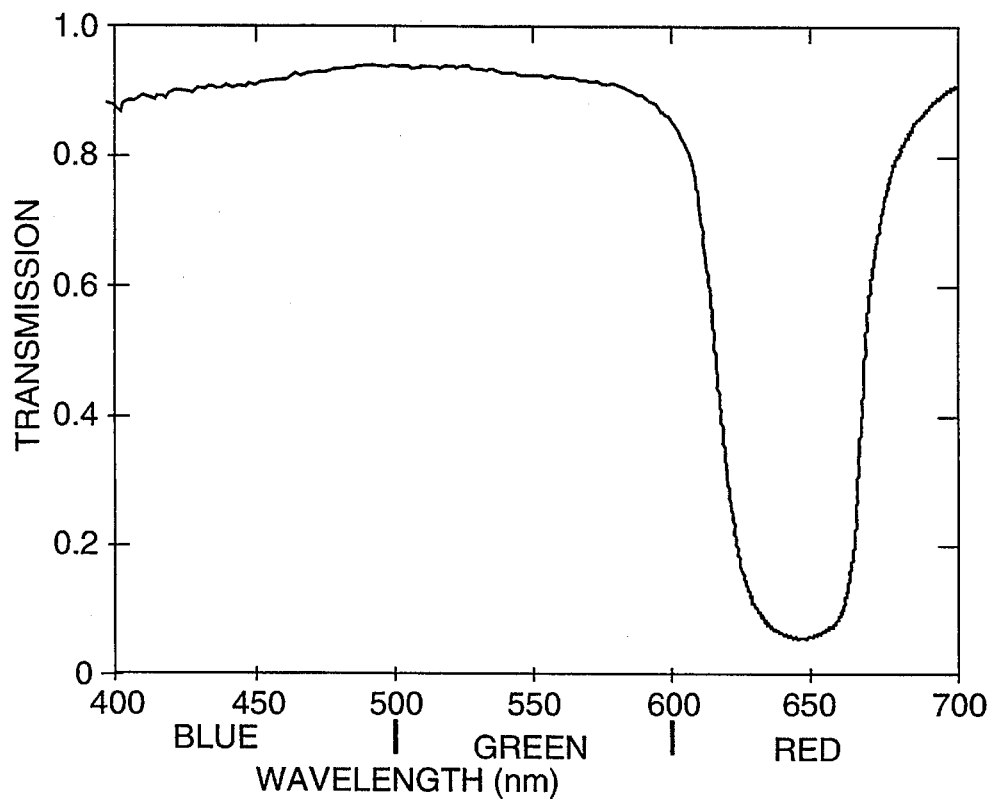
FIG. 3 shows an exemplary spectrum of a holographic mirror.
Figure 2:
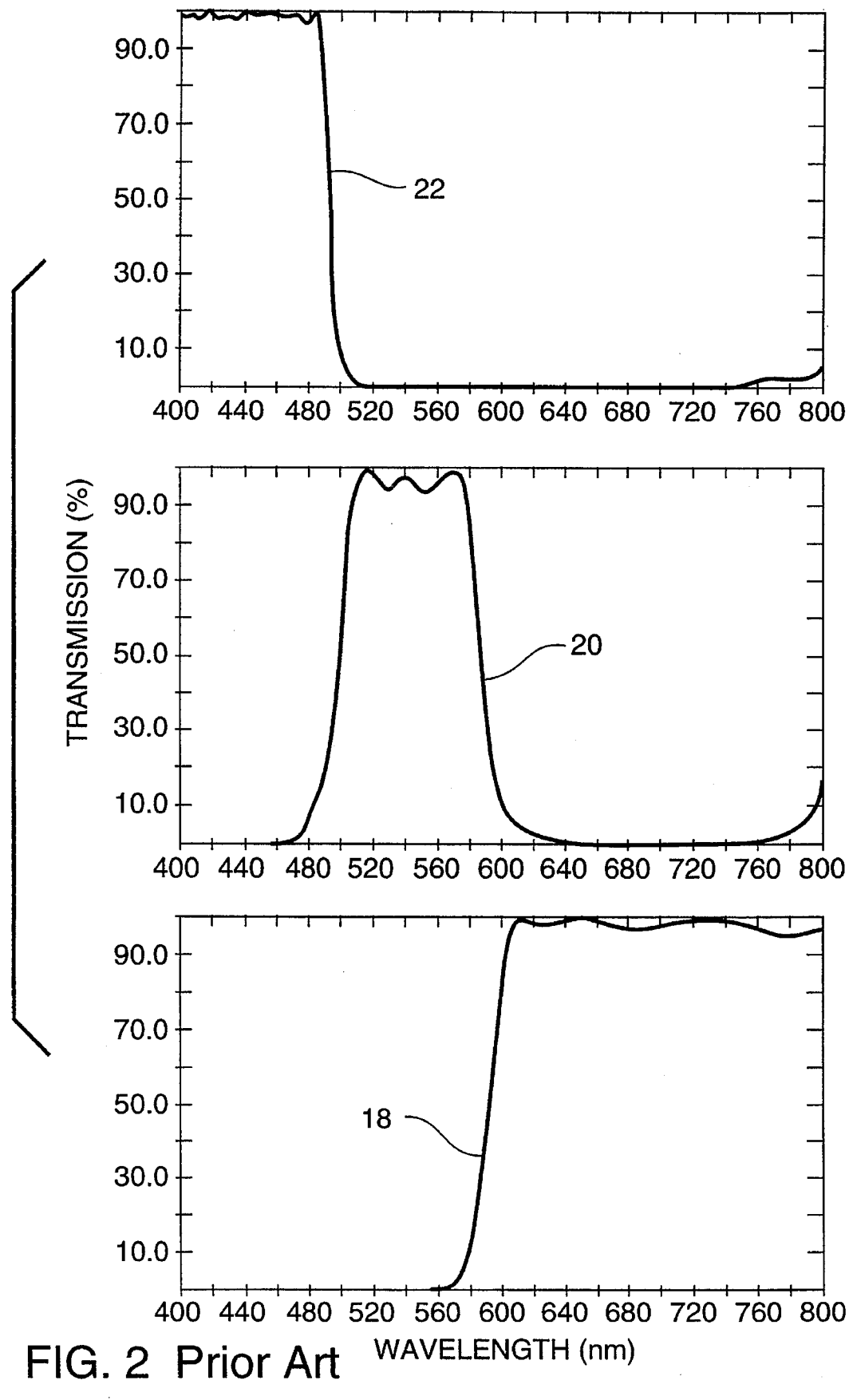
FIG. 2 shows the three spectra of a vacuum deposited color filter.

The preferred color filter array 94 includes sets of three holograms that reflect selected wavelengths of light so that color stripes 110, 112, and 114 reflect different ones of three primary colors. Holograms constructed to reflect certain wavelengths of light are sometimes called holographic mirrors. FIG. 3 shows a spectrum of a holographic mirror that reflects green light. A holographic mirror has the high transmission and sharp edge transitions of interference filters, but because it is made with sinusoidal refractive index changes, a holographic mirror does not have the undesired "ringing" that characterizes vacuum deposited interference filters.

A holographic mirror changes its color with angle of reflection of the light. The reflected light is always reddest for light that is perpendicularly reflected from the mirror, and shifts toward blue as the angle of incidence increases. Mathematically, the ratio of the wavelength at any angle of incidence divided by the wavelength of light reflected perpendicularly by the mirror is equal to the cosine of the internal angle of the light. Internal angle means that Snell's law must be taken into account to predict the effect of refraction when the external light enters the medium of the interference mirrors. Techniques for making holograms are well known. One textbook on optical holography is Collier, Burkhart, and Lin, *Optical Holography*, Academic Press, 1971.

Figure 8A:
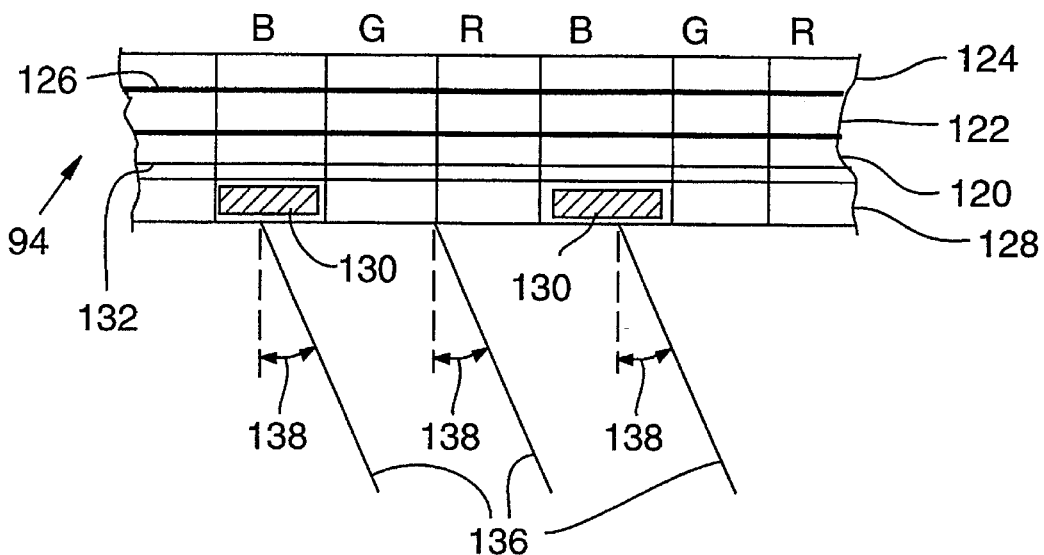
FIGS. 8A, 8B, and 8C are schematic diagrams showing plan fragmentary views of the various alignments of optical components used to expose a holographic recording material to one wavelength of light at three different angles of incidence to construct a three-color color filter array.
Figure 8B:
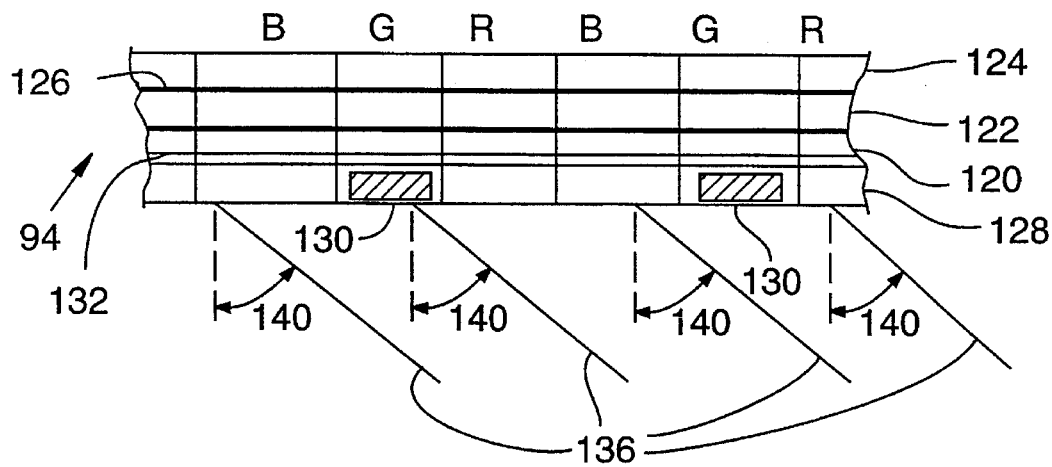
Figure 8C:
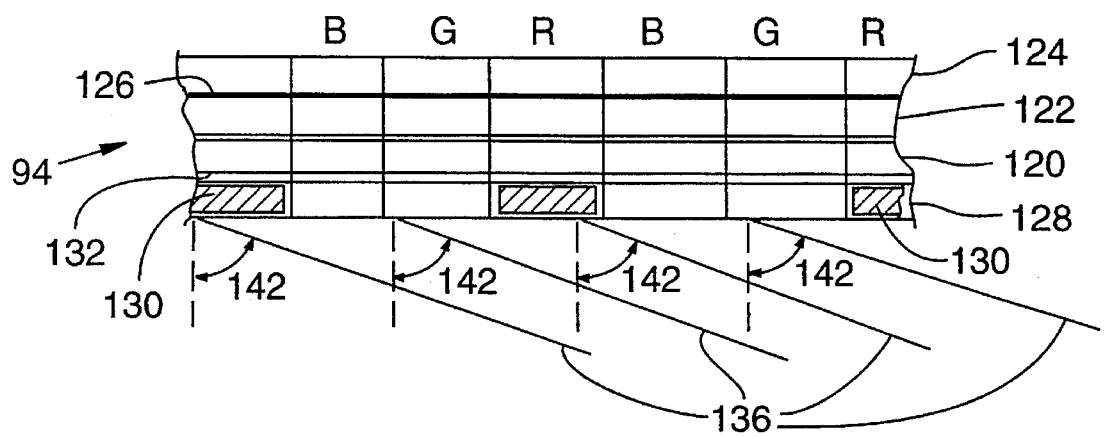

FIGS. 8A, 8B, and 8C are schematic diagrams showing plan fragmentary views of the various alignments of the optical components used to expose in sequence a holographic recording material to one wavelength of light at three different angles of incidence to construct a three-color color filter array 94. Color filter array 94 includes an optically transparent substrate 120, such as a glass or plastic material, on which a thin layer 122 of holographic recording material is coated. Preferred holographic recording materials for layer 122 are of an organic type and include silver halide, photopolymer, polyvinyl carbazole, and dichromated gelatin. Dichromated gelatin is especially preferred for layer 122 because of its high reflection efficiency with low scatter and noise properties over a relatively wide 100 nanometer bandwidth needed to reflect a complete primary color.

Color filter array 94 is constructed by positioning a mirror 124 adjacent the substrate noncontacting surface 126 of gelatin layer 122. An index matching fluid such as xylene is placed between mirror 124 and surface 126 to prevent the production of unwanted light reflections during exposure. A light blocking template 128 having an array of opaque stripes 130 is selectively positioned adjacent the uncoated surface 132 of substrate 120 to be in proximity to gelatin layer 122. Opaque stripes 130 are of the same width as the width of color stripes 110, 112, and 114, and next adjacent opaque stripes 130 are spaced apart by the same distance as the distance between next adjacent groups of color filter elements 108. The spacing between adjacent opaque stripes 130 corresponds to the spacing between one of the three primary colors of color filter array 94. Thus, opaque stripes 130 occupy one-third of the area occupied by display elements 96.

To construct color filter array 94 with color stripes 110, 112, and 114, a source (not shown) of monochromatic light such as a laser is directed at the optical component assembly to expose it multiple times in the following manner. With reference to FIGS. 8A, 8B, and 8C, the light source emits light rays 136 selectively at three angles of incidence, each corresponding to one of the three primary colors transmitted by the respective color stripes 110, 112, and 114. Template 128 is selectively positioned in three locations of gelatin layer 122 so that opaque stripes 130 block light rays 136 incident to locations corresponding to those of color stripes 110, 112, and 114. Each of the three locations of template 128 corresponds to a different one of the angles of incidence. Light rays 136 not blocked by opaque stripes 130 propagate through substrate 120 and gelatin layer 122, reflect off mirror 124 as reflected light rays, and re-enter gelatin layer 122 to interfere with the incoming light rays 136 to form a reflection hologram. The reflection hologram reflects the color of light corresponding to the wavelength of light rays 136 and the angle of incidence to the surface of gelatin layer 122.

With particular reference to FIG. 8A, light rays 136 strike the surface of template 128 at a first angle of incidence 138, and template 128 is positioned so that its opaque stripes 130 block a region of gelatin layer 122 corresponding to color stripe 110. With particular reference to FIG. 8B, light rays 136 strike the surface of template 128 at a second angle of incidence 140, and template 128 is positioned so that its opaque stripes 130 block a region of gelatin layer 122 corresponding to color stripe 112. With particular reference to FIG. 8C, light rays 136 strike the surface of template 128 at a third angle of incidence 142, and template 128 is positioned so that its opaque stripes 130 block a region of gelatin layer 122 corresponding to color stripe 114. Color stripes 110, 112, and 114 are formed by exposure to light rays 136 at two different angles of incidence such that each of color stripes 110, 112, and 114 transmits light of only one primary color that is different from the primary colors transmitted by the other two color stripes.

It is known that the color of reflection holograms can be controlled by several processing variables. For example, increasing the amount of ammonium dichromate in the original dichromated gelatin emulsion causes a final color shift to shorter wavelengths. This is so because the dichromate washes out of the emulsion during development and makes it shrink in thickness. Because the emulsion has shrunk, the fringes that reflect light are more closely spaced together and thereby reflect shorter wavelengths of light. The swelling (or shrinking) ratio "s" is the ratio of the final emulsion thickness to that during exposure.

In one preferred embodiment, all of the exposures are to light rays 136 of 488 nanometer wavelength (blue) because high power argon lasers are available and dichromated gelatin is sensitive at this wavelength. Light incident at angle 138 produces color stripes 110 and 112 that reflect blue light, light incident at angle 140 produces color stripes 110 and 114 that reflect green light, and light incident at angle 142 produces color stripes 112 and 114 that reflect red light. Thus, color stripes 110, 112, and 114 transmit red, green, and blue light, respectively.

As will be discussed later, when reducing the spatial coherence by enlarging the size of the light source, there must be a nonzero angle of incidence to suppress spurious interference. Likewise, at very large angles of incidence, there is a problem of light rays 136 reflecting off the surface of template 128. When using 488 nanometer wavelength light and a gelatin layer 122 with a swelling ratio s=0.95, a 10° exposure angle 138 produces a 467 nanometer (blue) final mirror for color stripes 110 and 112, a 45° exposure angle 140 produces a 525 nanometer (green) final mirror for color stripes 110 and 114, and an 80° exposure angle 142 produces a 614 nanometer (red) final mirror for color stripes 112 and 114. All angles of incidence are measured relative to the surface normal of template 128.

When assembled in flat panel display 90, color stripes 110 are spatially aligned with display elements 96 that display red information, color stripes 112 are spatially aligned with display elements 96 that display green information, and color stripes 114 are spatially aligned with display elements 96 that display blue information. Three adjacent display elements 96 defined by a row electrode 100 and spatially aligned with a group 108 of color filter elements represent a full color image pixel.

One drawback of this method is the possible blurring of display elements 96 resulting from the thickness of substrate 120 because it separates template 128 from gelatin layer 122. If the exposing light rays 136 propagate from a large source, substrate 120 is thick, and display elements 96 are small, display elements 96 may be blurred.

A possible solution for implementation during production would be to replace mirror 124 with a holographic template that was to be copied, and omit blocking template 128. When uniformly exposed to blue light, the blue display elements 96 would reflect at a perpendicular angle of incidence, and the green and red would be dark. When uniformly exposed to blue light at a intermediate angle of incidence, the green mirrors would reflect and the red and blue mirrors would be dark. When uniformly exposed to blue light at a glancing angle of incidence, only the red mirrors would reflect the blue light.

Figure 9A:
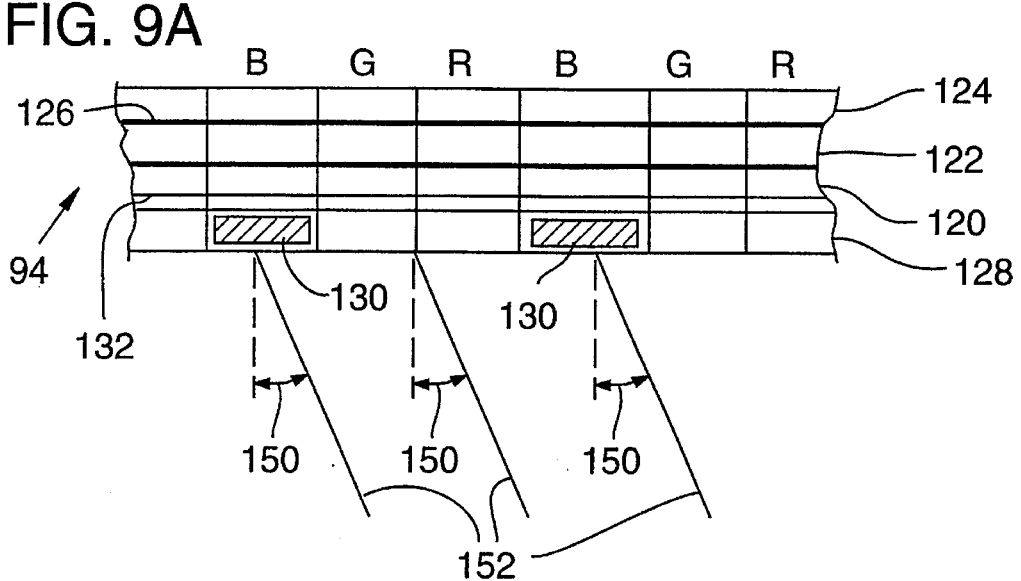
FIGS. 9A, 9B, and 9C are schematic diagrams showing plan fragmentary views of the alignments of optical components used to expose in sequence a holographic recording material to three wavelengths of light at the same angle of incidence to construct a three-color color filter array.
Figure 9B:
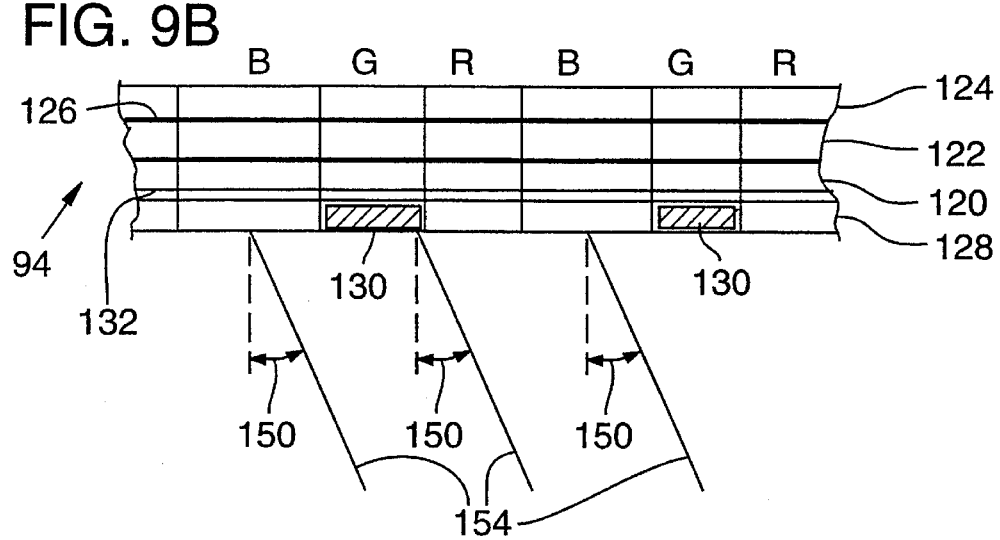
Figure 9C:
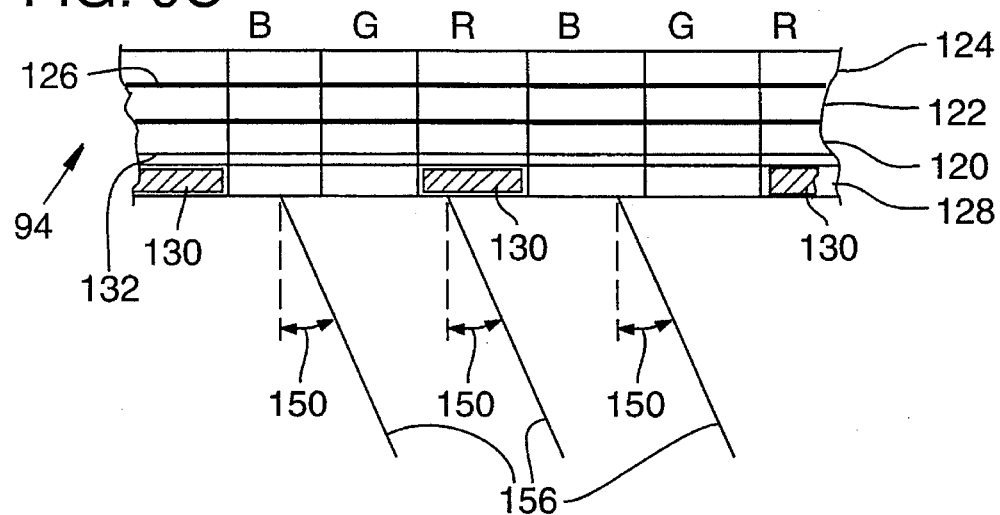

In a second preferred embodiment, an alternative method of making the array of holographic mirrors that is free of the above-described blurring entails the use of three wavelengths of light as shown in FIGS. 9A, 9B, and 9C. FIGS. 9A, 9B, and 9C are schematic diagrams showing plan views of the various alignments of the optical components used in the second preferred embodiment, which expose in sequence a holographic recording material to three wavelengths of light at the same angle of incidence to construct a three-color color filter array 94. Color filter array 94 is constructed by positioning a mirror 124 adjacent the substrate noncontacting surface 126 of gelatin layer 122, as was described for FIGS. 8A, 8B, and 8C.

With reference to FIGS. 9A, 9B, and 9C, a light source is positioned to emit at one angle of incidence 150 light rays selectively of three different wavelengths, each corresponding to one of the three primary colors transmitted by the respective color stripes 110, 112, and 114.

With particular reference to FIG. 9A, light rays 152 of a first wavelength of light strike the surface of template 128, which is positioned so that its opaque stripes 130 block a region of gelatin layer 122 corresponding to color stripe 110. With particular reference to FIG. 9B, light rays 154 of a second wavelength of light strike the surface of template 128, which is positioned so that its opaque stripes 130 block a region of gelatin layer 122 corresponding to color stripe 112. With particular reference to FIG. 9C, light rays 156 of a third wavelength of light strike the surface of template 128, which is positioned so that its opaque stripes 130 block a region of gelatin layer 122 corresponding to color stripe 114. Color stripes 110, 112, and 114 are formed by exposure to light rays of two different wavelengths such that each of color stripes 110, 112, and 114 transmits light of only one primary color that is different from the primary colors transmitted by the other two color stripes.

In a preferred embodiment, all of the exposures to the light rays are at an angle of incidence 150 of between 10 and 80 degrees so that light of the first or 480 nm wavelength produces color stripes 110 and 112 that reflect blue light, light of the second or 540 nm wavelength produces color stripes 110 and 114 that reflect green light, and light of the third or 660 nm wavelength produces color stripes 112 and 114 that reflect red light. Thus, color stripes 110, 112, and 114 transmit red, green, and blue light, respectively. Swelling the thickness of gelatin layer 122 permits the use of other wavelengths of light to construct color stripes 110, 112, and 114 that transmit red, green, and blue light, respectively.

If three wavelengths are being used to make the three color filters, then the reflectivity of a mirror can be designed to reflect the three wavelengths in controlled amounts to give a controlled object to reference beam ratio. This would allow another degree of freedom for controlling the characteristics of the three color filters. Template 128 could be combined with mirror 124 by segmenting mirror 124 into pixels that reflect only two of the exposing wavelengths.

Figure 10:
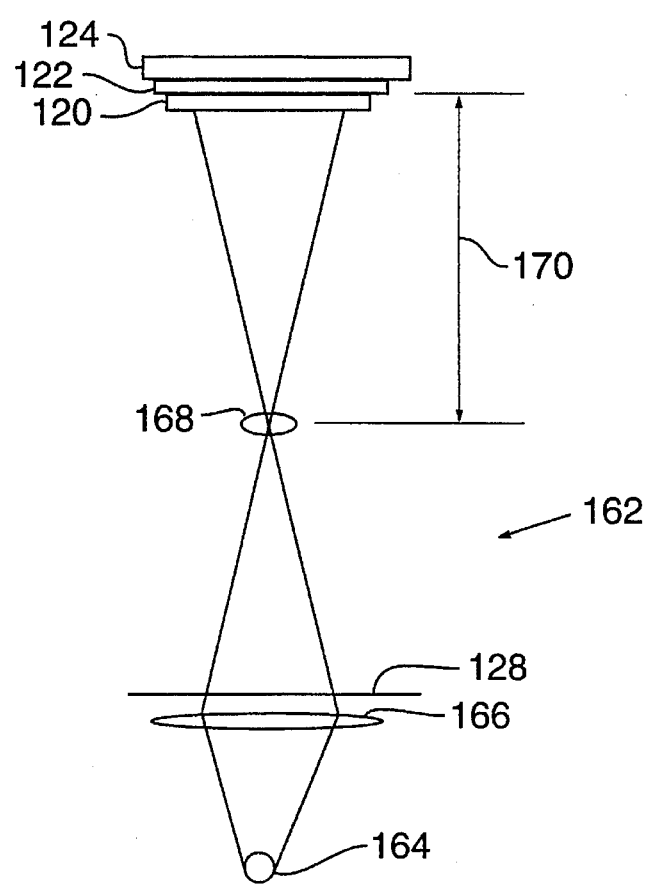
FIG. 10 shows the optical component arrangement for forming a color filter array without the use of a blocking template during exposure.

Because the angle of incidence 150 of the light need not change, template 128 can be imaged onto gelatin layer 122 with the use of an optical assembly 162 shown in FIG. 10. This technique would improve yield because template 128 cannot scratch or contaminate gelatin layer 122. In optical assembly 162, a light source 164 is imaged by a field lens 166 into a projection lens 168. Projection lens 168 images the opaque stripes 130 of blocking template 128 onto gelatin layer 122 and through substrate 120, where incident light reflected by mirror 124 interferes with incoming light to make holographic color filter array 94. If a projection lens 168 that is used to expose gelatin layer 122 and make filter array 94 is positioned about the same distance 170 away from filter array 94 in projection display panel 50 as that from lens 64 in overhead projector 54 to project a color LCD image, there would be no deviation of the color at the edges of the LCD even though the light is converging. Color filter array 94 can be used in converging light without color deviation from side to side because the angles used to make the holographic array are the same as those to used view it.

Figure 11A:
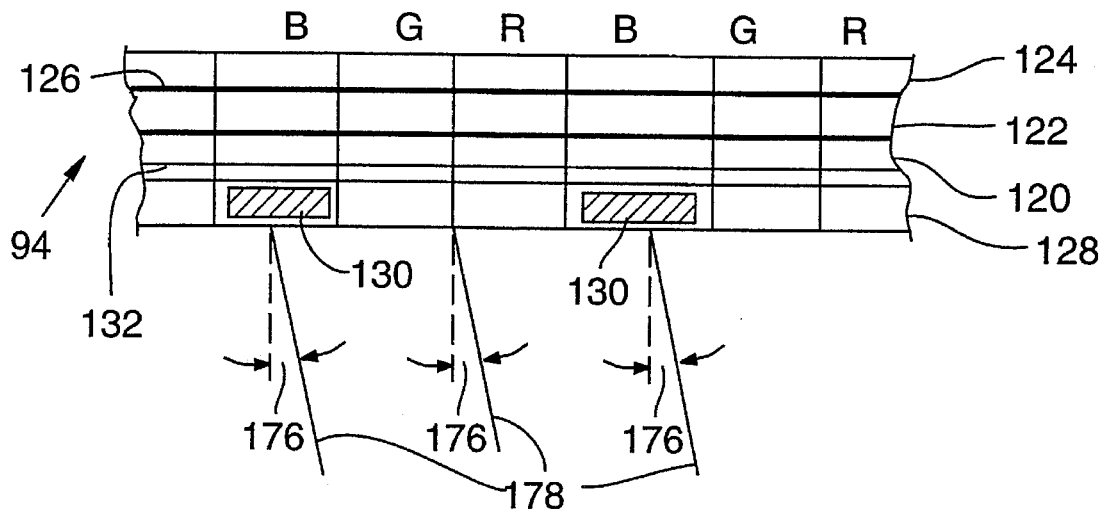
FIGS. 11A, 11B, and 11C are schematic diagrams showing plan fragmentary views of the alignments of optical components used to expose a holographic recording material to a combination of wavelengths of light at different angles of incidence to construct a three-color color filter.
Figure 11B:
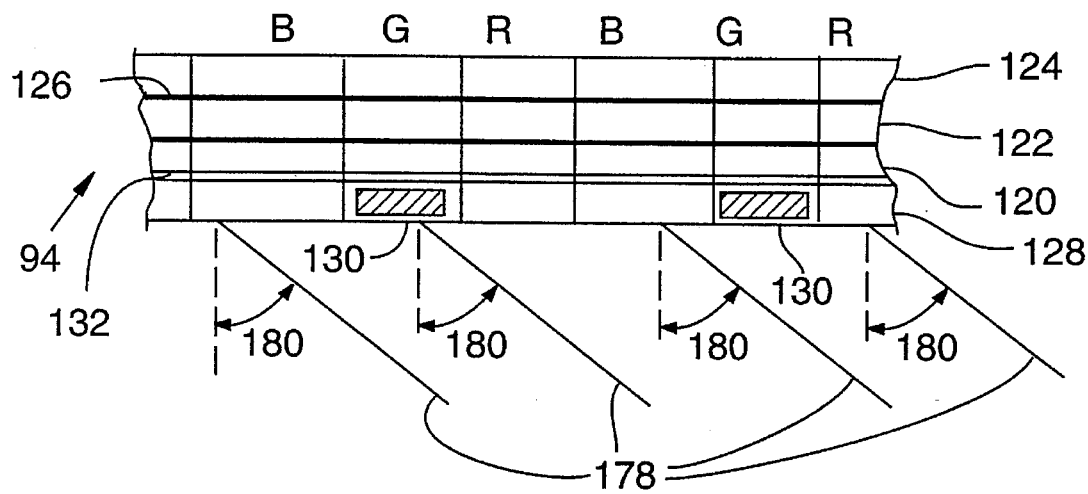
Figure 11C:
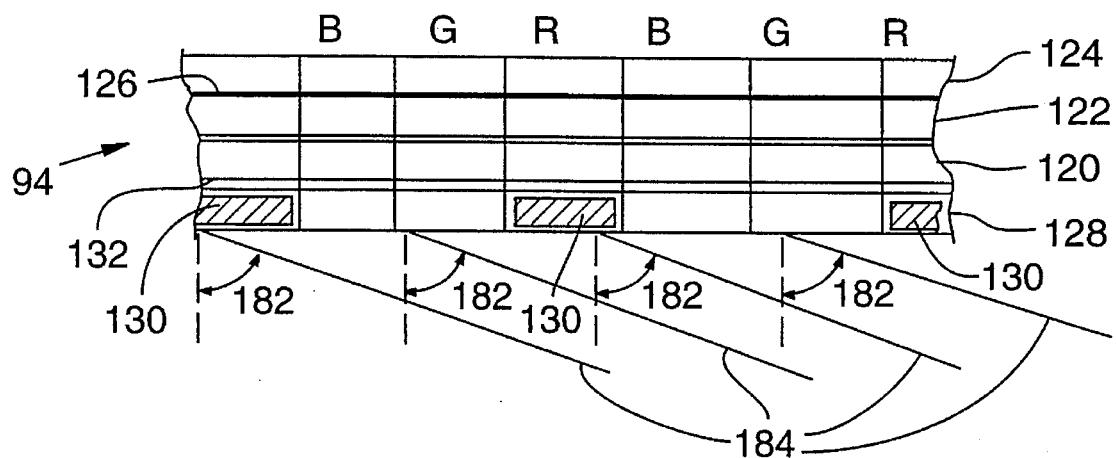

FIGS. 11A, 11B, and 11C are schematic diagrams showing a third embodiment that changes the angles of incidence and exposure wavelengths. With reference to FIGS. 11A, 11B, and 11C, when gelatin layer 122 is swollen back to the original thickness (s=1) an exposure angle 176 of 10° with a 458 nanometer wavelength argon light rays 178 produces a blue mirror at 461 nanometers for color stripes 110 and 112, an exposure angle 180 of 50° with the same 458 nanometer wavelength light rays 178 produces a green mirror at 533 nanometers for color stripes 110 and 114, and an exposure angle 182 of 60° with 514 nanometer wavelength argon light rays 184 produces a red mirror at 630 nanometers for color stripes 112 and 114.

It is known that high quality mirrors free of spurious transmission and reflection holograms can be made by using light of coherence so limited that interference occurs only over such a small path difference that only the desired holographic mirror is recorded. This is so because the path difference between the mirror and the holographic recording material is so small.

A popular conventional technique for reducing the spatial coherence is to increase the size of the light source. This can be done by illuminating the holographic recording material with several millimeter wavelength light being transmitted through a rotating diffuser. This method requires that the light be incident upon the mirror at some angle to blur the unwanted interference.

An alternative method for reducing temporal coherence entails the use of light sources of wider frequency content such as mercury vapor arc lamps. Dye lasers can also produce light of wide spectral content.

FIG. 12 is a fragmentary isometric view of flat panel display 90 showing the spatial relationship among column electrodes 98, row electrodes 100, and color filter array 94. With reference to FIG. 12, each of column electrodes 98 is positioned on the surface of one of color stripes 110, 112 and 114. Row electrodes 100 are positioned on the inner surface of a substrate 192. Column electrodes 98 and row electrodes 100 are preferably formed of indium tin oxide. Rubbed polyimide alignment layers 194 are deposited on column electrodes 98 and row electrodes 100 to properly align the liquid crystal molecules enclosed between substrates 120 and 192 when they are assembled to form flat panel display 90.

Figure 13:
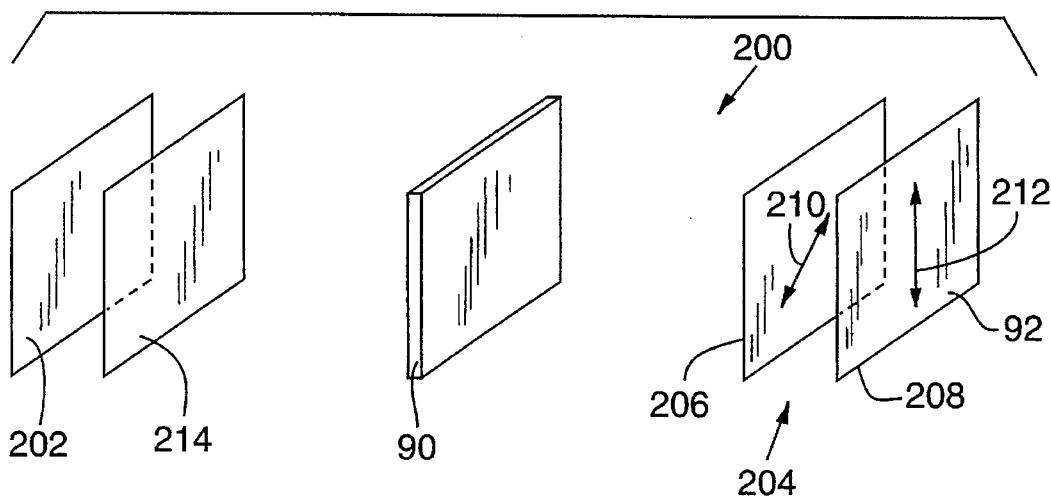
FIG. 13 is an exploded view of the optical component arrangement for a background light reflection compensated direct view display panel.

When used in a direct view display system, the holographic color filter array reflects different colors of ambient light that contaminate the image displayed to a viewer. FIG. 13 shows the optical component arrangement for absorbing background light reflection produced by a direct view display panel 200.

With reference to FIG. 13, display panel 200 includes a flat panel display 90 of a STN type that incorporates therein a color filter array 94 constructed in accordance with one of the preferred techniques described above. A linear polarizing filter 202 linearly polarizes light incident to panel display 90, and a circular analyzer 204 analyzes the light propagating from panel display 90. Circular analyzer 204 includes a quarter-wave plate 206 and a linear polarizer 208. Quarter-wave plate 206 has an optic axis 210, and linear polarizer 208 has a transmission axis 212 that is set at 45 degrees relative to optic axis 210 to form a circular analyzer in the conventional way. The orientation of the transmission axis (not shown) of polarizing filter 202 relative to optic axis 210 of quarter-wave plate 206 and transmission axis 212 of polarizing filter 208 depends upon the design characteristics of panel display 90 and other system design criteria known to those skilled in the art.

A retardation compensator plate 214 is positioned between linear polarizer 202 and flat panel display 90 to compensate the combined retardation of panel display 90 and quarter-wave plate 206 to give black-and-white operation when all display elements 96 in display 90 are turned off or on, respectively. Circular analyzer 204 prevents the reflection of ambient light to the eyes of an observer viewing display surface 92.

It will be obvious to those having skill in the art that many changes may be made in the above-described details of the preferred embodiment of the present invention without departing from the underlying principles thereof. As a first example, an alternative to using mirror 124 would entail allowing the exposure light to reflect off the interface between the holographic recording material layer 122 and air. This technique produces, however, a smaller ratio of reflected light to incident light (k ratio) and a corresponding lower bandwidth for the holographic filter. As a second example, positioning color stripes 110, 112, and 114 parallel to rows 100 would prevent a "walk off" problem of a color stripe appearing to bridge adjacent columns 98 when a viewer looks at a display surface 92 laterally at a large viewing angle. As a third example, mirror 124 could be replaced by mercury metal to ensure close contact with layer 122 of holographic recording material and avoid the use of xylene as an index matching fluid. The scope of the invention should, therefore, be determined only by the following claims.

I claim:

1. A method of making a light reflecting color filter array, comprising:

sequentially with a light source exposing first and second adjacent regions of photosensitive material causing then to have wavelength selective light-reflecting properties, in which the first region reflects light of a first primary color and transmits light of a second primary color, the second region reflects light of the second primary color and transmits light of the first primary color, and there are multiple first and second regions, the first and second regions being arranged so that along one axis no first region is contiguous with another first region and no second region is contiguous with another second region.

2. The method of claim 1 in which the exposure of the first regions is accomplished by illuminating the photosensitive material with an exposure wavelength at a first angle of incidence and exposure of the second region is accomplished by illuminating the photosensitive material with the exposure wavelength at a second angle of incidence.

3. The method of claim 1 in which the primary colors are selected from a group consisting of red, green, and blue.

4. The method of claim 1 in which the photosensitive material includes a holographic recording material.

5. The method of claim 4 in which the holographic recording material includes dichromated gelatin.

6. The method of claim 1 in which the photosensitive material has two major surfaces one of which is supported on a substrate, the method further comprising positioning on the other major surface of the photosensitive material optically transparent electrodes in the first and second regions so that they extend in a direction along the one axis.

7. The method of claim 1, further comprising sequentially exposing a third region of photosensitive material adjacent one of the first and second regions of photosensitive material to have wavelength selective light-reflecting properties, the third region reflecting light of the first and second primary colors and transmitting light of a third primary color, and the third region being arranged so that along the one axis no third region is contiguous with another third region.

8. The method claim 7 in which the primary colors include red, green, and blue.

* * * * *